United States Patent [19]
Oba et al.

[11] Patent Number: 5,694,575
[45] Date of Patent: Dec. 2, 1997

[54] DIRECT I/O CONTROL SYSTEM WITH PROCESSOR, MAIN MEMORY, AND CACHE EMPLOYING DATA CONSISTENCY RETAINING SCHEME

[75] Inventors: Nobuyuki Oba, Sendai; Shigenori Shimizu, Kawasaki, both of Japan

[73] Assignee: International Business Machines Corp., Armonk, N.Y.

[21] Appl. No.: 550,545

[22] Filed: Nov. 7, 1995

Related U.S. Application Data

[63] Continuation of Ser. No. 84,649, Jun. 28, 1993, abandoned.

[30] Foreign Application Priority Data

Jul. 2, 1992 [JP] Japan ................................. 4-175398

[51] Int. Cl.$^6$ ............................ G06F 12/08; G06F 13/28
[52] U.S. Cl. ........................... 395/473; 395/842; 395/494
[58] Field of Search .............................. 395/842–848, 395/468–473, 494

[56] References Cited

U.S. PATENT DOCUMENTS

| | | | |
|---|---|---|---|
| 4,504,902 | 3/1985 | Gallaher et al. | 395/425 |
| 4,843,542 | 6/1989 | Dashiell et al. | 395/425 |
| 5,119,485 | 6/1992 | Ledbetter, Jr. et al. | 395/473 |
| 5,148,533 | 9/1992 | Joyes et al. | 395/471 |
| 5,214,767 | 5/1993 | Wanner et al. | 395/425 |
| 5,228,134 | 7/1993 | MacWilliams et al. | 395/425 |
| 5,247,648 | 9/1993 | Watkins et al. | 395/470 |
| 5,265,235 | 11/1993 | Sindhu et al. | 395/425 |
| 5,297,269 | 3/1994 | Donaldson et al. | 395/425 |
| 5,325,504 | 6/1994 | Tipley et al. | 395/425 |
| 5,327,547 | 7/1994 | Stiles et al. | 395/425 |
| 5,359,723 | 10/1994 | Mathews et al. | 395/449 |

*Primary Examiner*—Matthew M. Kim

[57] ABSTRACT

The computer system comprises a processor 1, a cache memory 2 of this processor, a main memory 4, an I/O device 6 directly accessible to this main memory, an I/O controller 7, and the like. It is made so that the I/O controller can execute processing to retain data consistency between the cache memory and the main memory during access to the main memory by the I/O device. The I/O controller has an address buffer 9 that retains the cache line address of the previous access by the I/O device and it is made so that the consistency maintenance operation is not executed in cases other than the first access when accesses to the main memory by the I/O device are made continuously in the same data block.

2 Claims, 4 Drawing Sheets

| VALID | SHARED | STATE |
|-------|--------|-------|
| 0 | 0 | INVALID |
| 0 | 1 | INVALID |
| 1 | 0 | VALID-NOT_SHARED |
| 1 | 1 | VALID-SHARED |

DIRECT I/O CONTROL SYSTEM WITH PROCESSOR, MAIN MEMORY, AND CACHE EMPLOYING DATA CONSISTENCY RETAINING SCHEME

This is a continuation of application Ser. No. 08/084,649 filed Jun. 28, 1993, now abandoned.

BACKGROUND OF THE INVENTION

This invention relates to a computer system comprising a cache memory and, more particularly to a computer system enabling the consistency of data between the main memory and the cache memory to be kept effectively.

With the recent speed improvements in microprocessors, it has become common to use a cache memory to compensate for the speed difference between the main memory and the microprocessor. The cache memory is installed inside the microprocessor (on-chip cache) or placed between the microprocessor and the system bus (off-chip cache). In cases when a cache memory is provided, cache consistency will be the major problem. In other words, to put it simply, the problem is whether or not the data contained in the cache memory is always the latest. If old data remains in the cache memory when new data is written in the main memory from outside, the microprocessor reads that old data and proper operations cannot be performed.

The standard configuration of a personal computer as shown in FIG. 1 is assumed. The processor 1 is connected with the processor bus 3 through the cache memory 2. The main memory 4, DMA (direct memory access) controller 5, and various I/O devices (input/output I/O device 6) are likewise connected to that processor bus 3. In addition, 7 is an I/O controller and 8 is an I/O bus. The I/O controller 7 carries out the memory control function of the main memory 4 and the bus interface function between the processor bus 3 and the I/O bus 8. For the memory control, Read/Write, Address, data, Byte-enable, Access-strobe (RAS/CAS), etc. are exchanged between the I/O controller 7 and the main memory 4, and Read/Write, Address, data, Byte-enable, Access-strobe, Ready, etc. are exchanged between the I/O controller 7 and the I/O device 6. In addition, the bus interface function is to accommodate the differences between the signal lines of the processor bus 3 and the I/O bus 8.

When the processor 1 reads data from the main memory 4, that data is supplied to the processor 1 and simultaneously stored in the cache memory 2. Once data is stored in cache memory 2, it is not necessary to fetch that data from the main memory 4 and that data can be supplied from the cache memory 2 when the processor 1 carries out reading again. Since cache memory 2 is made with a very high-speed memory device even though its capacity is small compared with main memory 4, the time required for reading data is greatly reduced. The speed with respect to writing in addition to reading is also increased because data in cache memory 2 can be rewritten without writing in main memory 4 when the processor 1 carries out writing data which is stored in cache memory 2. So, when the cache memory 2 is used, the performance of the processor 1 can be improved by increasing the memory access speed. One problem is generated here, however. In cases when the cache memory 2 is not provided, the data are stored only in the main memory. But when the cache memory 2 is installed, the data is stored also in the cache memory 2 as a matter of course. It should be noted that not only the processor 1, but also other units access the main memory 4. That is, the DMA controller 5 and some I/O devices 6 access the main memory 4.

Assume that the data in address A is stored in the cache memory 2. The DMA controller 5 reads data from the I/O device 6 and writes it in address A of the main memory 4. If the data stored in the cache memory 2 is left as it is, the processor 1 continues reading old data forever and cannot read the latest data brought by the DMA controller 5.

The problem occurs similarly even in reverse cases. Assume that the processor 1 rewrites data in address A. The rewritten data is stored only in the cache memory 2 and is not reflected immediately in the main memory 4. Even if the DMA controller 5 reads data in address A from the main memory 4 and sends it to the I/O device 6, the latest data in the cache memory 2 still remains in it. The DMA controller 5 reads old data unless the latest data is written back to the main memory 4 from the cache memory 2.

In conventional computers, the cache consistency problem was solved as follows.

(1) When the processor carries out writing, the data in the main memory is also rewritten. This is called the write through mechanism. With this mechanism, the latest data given by the processor is written in the cache memory and, at the same time, it is written in the main memory as a matter of course. Therefore, the data can always be read out from the main memory without worrying about the content of the cache memory. The write through mechanism is inferior to the following write back mechanism because the data must be always written into not only the cache memory, but also the main memory every time when the processor carries out writing.

(2) When the processor carries out writing, only the data in the cache memory is rewritten, unlike in the system (1). This is called the write back mechanism. Since there is a possibility that the contents of the main memory and the cache memory are different, when the DMA controller reads data from the main memory, the data in the cache memory must also be retrieved (snooped) at the same time, and if the latest data is stored only in the cache memory, the data is supplied from the cache memory. In addition, if the data stored in the cache memory is different from that in the main memory, it is said that the data in the cache memory is in a DIRTY or MODIFIED state. In the write back mechanism, even when the processor carries out writing, if there is data in the cache memory, the data is written only in it and the data in the main memory is not updated. Therefore, from a performance viewpoint, the write back mechanism is more desirable than the write through mechanism.

(3) When the DMA controller writes data in the main memory, if data having the same address is also in the cache memory, this has to be deleted (invalidated). After that, since there is no data in the cache memory even if the processor goes to the same address to read, it goes to the main memory to read the latest data. Attention must be paid so that if the write back mechanism such as shown in (2) is used, the data in the cache memory cannot be invalidated unconditionally because there is a possibility that the latest data exists only in the cache memory. That is, if the entire cache line is invalidated when part (4 bytes) of the specified cache line (32 bytes, for example) is written by the DMA controller, the remaining latest data (28 bytes) in said cache line is deleted. Therefore, if the data in the cache memory is in the DIRTY state, it must be first written back to the main memory and later be invalidated.

The DMA controller access was used as an example here, but in the actual system, not only the DMA controller, but also the I/O device can directly access the main memory. There is a reference related to this invention. That is IBM Technical Disclosure Bulletin, Vol. 32, No. 8B, pp. 288–290, "SYSTEM BUS TAG RAM." In this reference, a snoop is carried out only in cases when the cache memory is specified by a tag memory which shows whether or not the cache memory has a copy because overhead increases if a snoop is carried out and the data is invalidated for each writing of the bus master in the memory. However, this reference does not describe anything about the reduction of overhead by using characteristics of I/O data transfer.

Conventional mechanisms have the following disadvantages:

(1) If the write back mechanism is used, the content of the cache memory must be retrieved for each access and whether or not the data is in the DIRTY state in the cache memory must be checked whenever the I/O device including the DMA controller read the data.

(2) In cases when the I/O device including the DMA controller writes data in the main memory, the content of the cache memory must be retrieved for each access, and if the data is in the non-DIRTY state in the cache memory, it is invalidated, and if the data is in the DIRTY state, it is written back to the main memory and after that it should be invalidated. Then, the data in the main memory is rewritten.

Therefore, the contents of the cache memory must be retrieved and it must be examined whether or not the contents are in a DIRTY state each time the I/O device carries out reading or writing onto the main memory; then the main memory is accessed. This lowers the memory access speed of the I/O device remarkably. Furthermore, since the cache memory is retrieved each time an I/O device access occurs, the cache memory cannot respond to the access from the microprocessor during its retrieval. This also greatly decreases the microprocessor's performance.

SUMMARY OF THE INVENTION

As known from the above, it is not effective to retrieve (snoop) the cache memory for all the accesses from the I/O device. This invention provides a mechanism for reducing the number of cache memory retrievals (frequency of snoops) required for I/O device access. Thus, to overcome the deficiencies of the prior art mentioned above, in this invention, an address buffer and an address comparator are provided to realize a mechanism having a cache consistency with the minimum number of cache memory retrievals (snoops) for memory accesses by I/O devices. In addition, this invention can apply to a cache memory of either the write through type or the write back type.

DESCRIPTION OF ILLUSTRATIVE EMBODIMENT(S)

Figure 1:
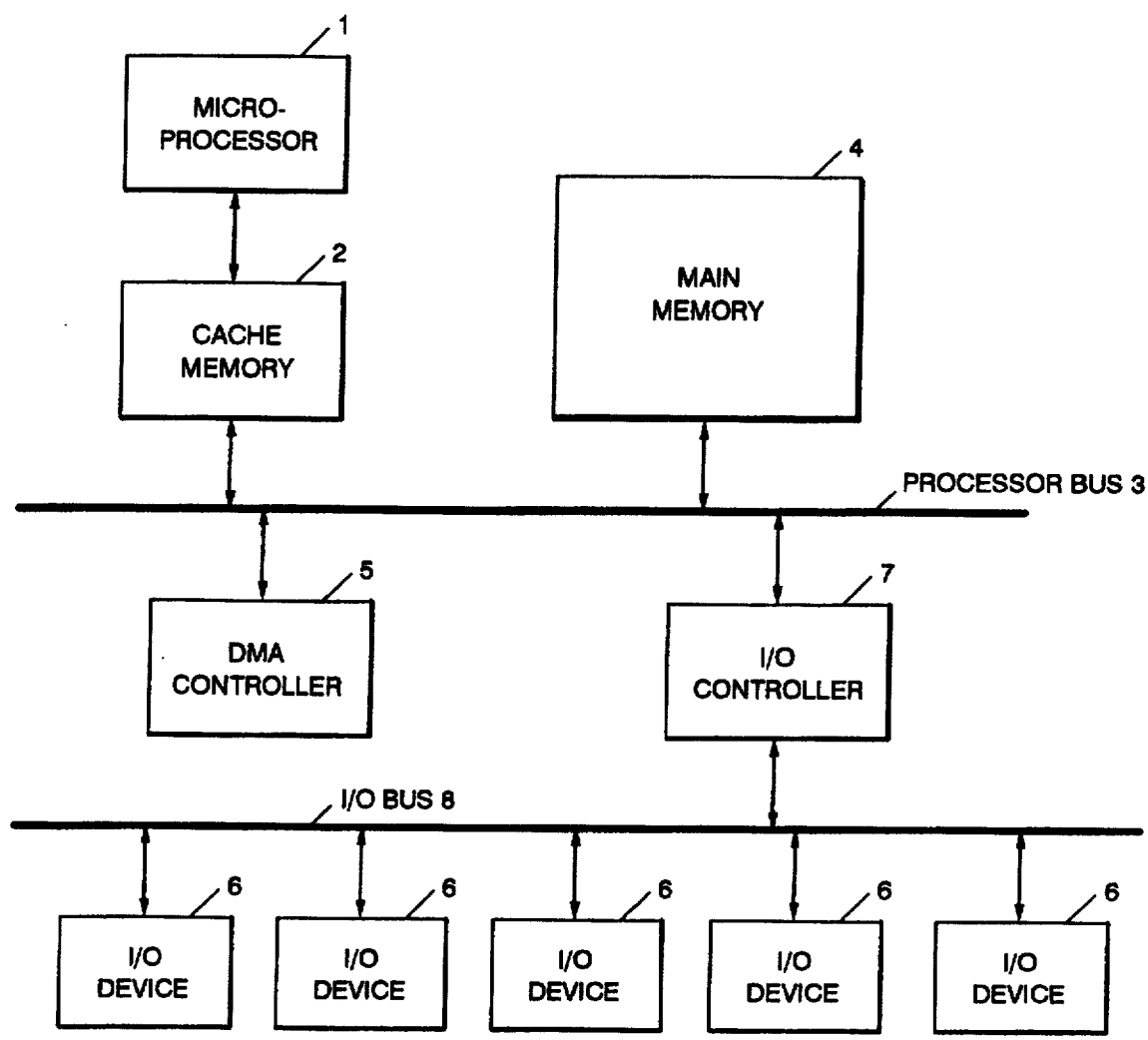
FIG. 1 is a block diagram explaining the conventional computer system.
Figure 2:
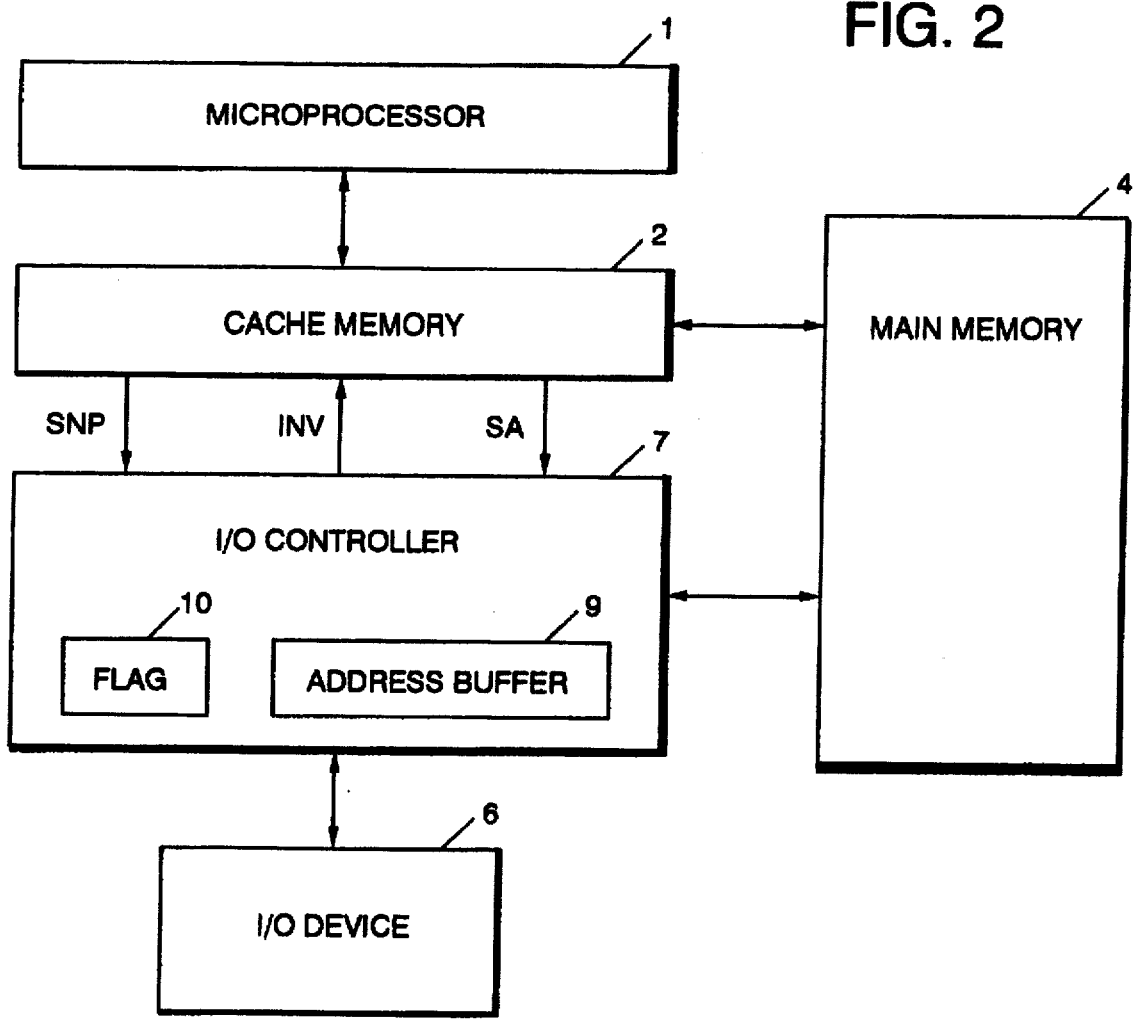
FIG. 2 is a block diagram explaining the configuration of the embodiment of this invention.

An embodiment of the invention is explained by referring to FIGS. 2 through 5. In addition, in FIG. 2, the corresponding numbers are given for the places corresponding to FIG. 1. FIG. 2 shows a system comprising a microprocessor 1, cache memory 2, I/O controller 7, and I/O device 6. In FIG. 2, the I/O controller 7 has an address buffer 9 inside so that the memory access address from the I/O device 6 can be retained.

In addition, the controller 7 includes two control signal lines, SNP (snoop) and INV (invalid), coupling it to the cache memory 2. The retrieval of the cache memory 2 is controlled by these two control lines. When SNP is 0, the cache memory 2 does not do anything. When SNP is 1, the cache memory 2 retrieves (snoops) inside the cache memory 2 by using an address (address of the I/O device's 6 access) given from the I/O controller 7. With that action, if INV is 1 and the data having the same address is in the cache memory 2, that data is invalidated. The cache memory 2 provides an SH (shared) signal is given to the I/O controller 7. This signal is set to 1 if data having the same address is in the cache when the cache memory 2 is snooped. This is set to 0 if data having the same address is not in the cache. An alternative method which also realizes an effective snooping even when this SH signal cannot be provided is also shown separately.

Figure 3:
FIG. 3 is a diagram explaining the actions of the embodiment mentioned above.

The I/O controller 7 has an address buffer 9 and two bits (VALID, SHARED) of a flag 10. Unlike the cache memory 2, the I/O controller 7 cannot store data. There are three different states expressed by the combination of the bit values of the flag 2, as shown in FIG. 3. They are INVALID, VALID-NOT$_{13}$SHARED, and VALID-SHARED.

Both flags are set to zero (reset) at the time of system initialization. The address portion is composed of the upper N bits of address outputted by the microprocessor 1. N can be determined by subtracting the number of address bits required to represent a cache line size from the number of address bits of the microprocessor 1. For example, if the address outputted by the microprocessor 1 is 32 bits long and the line size of the cache memory 2 is 32 ($=2^5$) bytes, N=32 −5=27. The only hardware to be added to the I/O controller 7 for the construction of the invention are this address buffer and two of the flag bits; that is, a total of N+2 register bits.

Detailed operation of an embodiment in accordance with the invention is discussed below. When the access address generated by the microprocessor 1 or the I/O device 6 matches the value in the address buffer in the I/O controller 7, it is called a HIT, and when they do not match, it is called a MISS. When the valid flag is 0; that is, when the flag shows INVALID state, it is always a MISS. In the case of a HIT at the time of reading data in main memory 4, it is called a Read-Hit, and in the case of a MISS, it is called a Read-Miss. Similarly, in the case of writing, they are called a Write-Hit and Write-Miss, respectively. Furthermore, to distinguish an access from the microprocessor 1 from an access from the I/O device 6, those accesses generated by the microprocessor 1 are suffixed CPU central processor and those accesses generated by the I/O device 6 are suffixed I/O. They are summarized as follows:

| | |
|---|---|
| CPU-Read-Hit | Microprocessor has Read and HIT the address in the address buffer. |
| CPU-Read-Miss | Microprocessor has Read and not HIT the address in the address buffer. |
| CPU-Write-Hit | Microprocessor has Written and HIT the address in the address buffer. |
| CPU-Write-Miss | Microprocessor has Written and not HIT the address in the address buffer. |
| I/O-Read-Hit | I/O device has Read and HIT the address in the |

-continued

| | address buffer. |
|---|---|
| I/O-Read-Miss | I/O device has Read and not HIT the address in the address buffer. |
| I/O-Write-Hit | I/O device has Written and HIT the address in the address buffer. |
| I/O-Write-Miss | I/O device is Written and not HIT the address in the address buffer. |

The case when there is an SH signal from the cache memory 2; that is, the case when the I/O controller 7 can examine whether the addresses have HIT or not at the time of a cache memory 2 retrieval are explained below. Implementation in this case when there is no SH signal will be discussed later.

Figure 4:
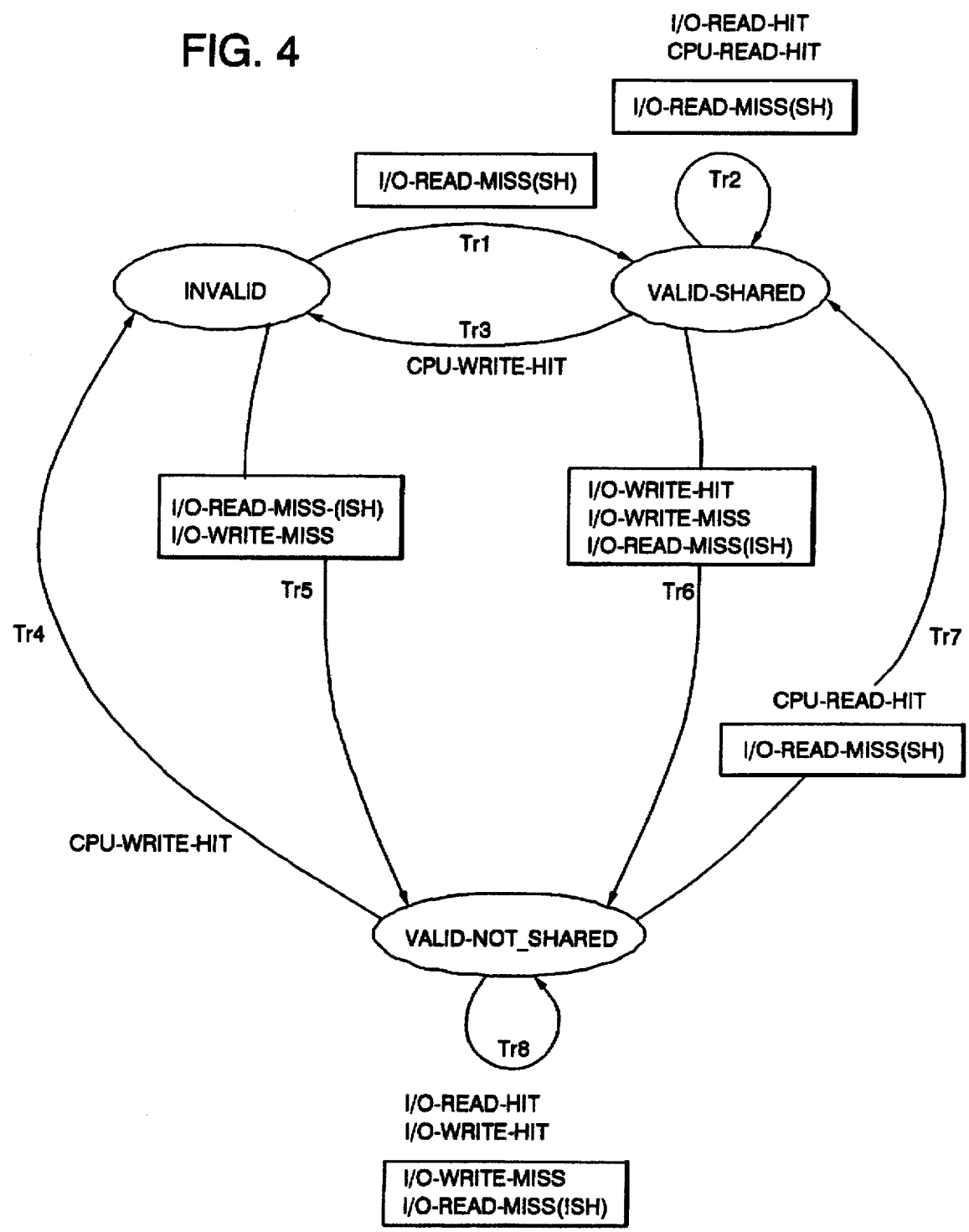
FIG. 4 is a state transition diagram explaining the actions of the embodiment mentioned above.

FIG. 4 shows a state transition diagram. Of the transitions shown in FIG. 4, those enclosed within the shaded areas require to snoop the cache memory 2 (retrieval).

(1) The I/O device's 6 access
  i) I/O-Read-Miss. The SNP signal is set to 1 and the INV signal is set to 0, and then the cache memory is made to snoop. When SH is returned (SH=1) from the cache memory as a result, the state is changed to VALID-SHARED. In FIG. 4, this action corresponds to transition Tr1, Tr2, or Tr7. When the present state is INVALID, the state changes to VALID-SHARED according to transition Tr1. When the present state is VALID-SHARED, the state remains in VALID-SHARED in accordance with transition Tr2. When the present state is VALID-NOT$_{13}$SHARED, the state changes to VALID-SHARED according to transition Tr7. On the other hand, when SH is not returned (SH=0), the state changes to VALID-NOT$_{13}$SHARED. In FIG. 4, the action corresponds to transition Tr5, Tr6, or Tr8. When the present state is INVALID, the state changes to VALID-NOT$_{13}$SHARED according to transition Tr5. When the present state is VALID-SHARED, the state changes to VALID-NOT$_{13}$SHARED according to transition Tr6. When the present state is VALID-NOT$_{13}$SHARED, the state remains in VALID-NOT$_{13}$SHARED according to transition Tr8. In FIG. 4, that SH is 1 is expressed by (SH) and that SH is 0 is expressed by (ISH). The address buffer 9 is updated with the address issued by the I/O device 6. The data in the cache memory is not invalidated because the INV signal is 0.
  ii) I/O-Write-Miss. The SNP signal is set to 1 and the INV signal is set to 1, and then, the cache memory is made to snoop. The state changes to VALID-NOT$_{13}$SHARED. When the present state is INVALID, the state changes to VALID-NOT$_{13}$SHARED according to transition Tr5. When the present state is VALID-SHARED, the state changes to VALID-NOT$_{13}$SHARED according to transition Tr6. When the present state is VALID-NOT$_{13}$SHARED, the state remains in VALID-NOT$_{13}$SHARED according to transition Tr8.
  iii) I/O-Read-Hit. A snoop is not required. Both the SNP and INV signals remain 0. The data is obtained from the main memory. In FIG. 4, the action corresponds to transition Tr2 or Tr8 and the state will not change.
  iv) I/O-Write-Hit. If the state is VALID-SHARED, the SNP signal is set to 1 and the INV signal is set to 1, and then, the cache memory is made to snoop. If the cache memory retains data having the same address, it is invalidated. The action corresponds to transition Tr6 in FIG. 4 and the state changes from VALID-SHARED to VALID-NOT$_{13}$SHARED. If the state is VALID-NOT$_{13}$SHARED, a snoop is not required. In FIG. 4, the action corresponds to transition Tr8 and the state remains VALID-NOT$_{13}$SHARED.

(2) Microprocessor's access
  i) CPU-Read-Miss. No changes (No actions).
  ii) CPU-Write-Miss. No changes (No actions).
  iii) CPU-Read-Hit. The state is changed to VALID-SHARED. When the present state is VALID-SHARED, the action corresponds to transition Tr2 in FIG. 4 and the state remains VALID-SHARED. When the present state is VALiD-NOT$_{13}$SHARED, the action corresponds to transition Tr7 in FIG. 4 and the state changes to VALID-SHARED.
  iv) CPU-Write-Hit. The state is changed to INVALID. When the present state is VALID-SHARED, the action corresponds to transition Tr3 in FIG. 4 and the state changes to INVALID. When the present state is VALID-NOT$_{13}$SHARED, the action corresponds to transition Tr4 in FIG. 4 and the state changes to INVALID.

The following shows the validity of this embodiment. Assume that the line size of cache memory 2 is 32 bytes. Also assume that the data transmission width of the I/O device 6 is 4 bytes and 32-byte consecutive data is read from the main memory 4. Under these conditions, the I/O device 6 generates eight (32 bytes/4 bytes=8 times) memory reading accesses. In the conventional method, the I/O controller 7 had to carry out the snoop operations (8 times in total) each time the I/O device 6 generated access. The use of the mechanism in this embodiment, however, requires the snoop operation only once for the first time. For example, assume that the state is INVALID before the I/O device 6 generates an access. In the first I/O-Read-miss, when SH is 1, the state changes to VALID-SHARED (transition Tr1), and when SH is 0, the state changes to VALID-NOT$_{13}$SHARED (transition Tr5), as shown in FIG. 4. At that time, a snoop operation is carried out. However, once the state changes to VALID-SHARED or VALID-NOT$_{13}$SHARED, the snoop operation is not required any more because the remaining seven accesses are I/O-Read-Hit. The number of snoop operations is reduced greatly from eight to one.

Similarly, assume that the I/O device 6 writes 32-byte consecutive data in the main memory 4. Eight accesses are generated as expected, but the use of the mechanism in this embodiment can reduce the frequency of snoops from eight times to one. Assume that the I/O device 6 was in the INVALID state before an access was executed. The state changes to VALID-NOT$_{13}$SHARED by the first I/O-Write-miss (transition Tr5). Since the remaining seven write accesses are all I/O-Write-Hit, the snoop is not required (transition Tr8).

Figure 5:
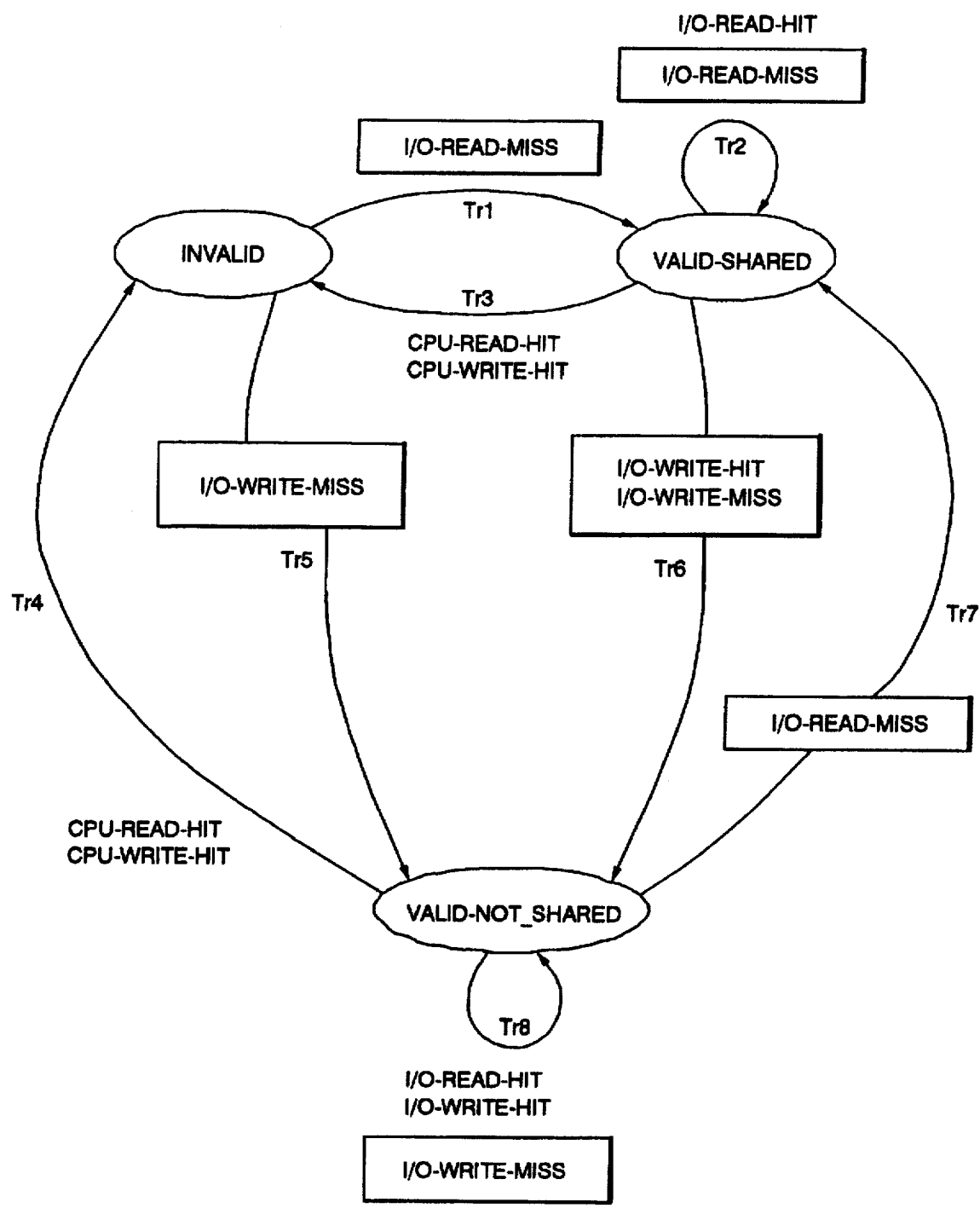
FIG. 5 is a state transition diagram explaining the change examples of the embodiment mentioned above.

Next, an alternative method when the SH signal is not obtained from the cache controller of the cache memory 2 is shown below. FIG. 5 shows a state transition diagram. There are two actions that are different from said embodiment. (1) In said embodiment, when an I/O-Read-Miss was generated, the SH signal was referred and the state changed to VALID-SHARED or VALID-NOT$_{13}$SHARED, but in this alternative method, the state always changes to VALID-SHARED. (2) In said embodiment, the state changed to VALID-SHARED in a CPU-Read-Hit, but in this alternative method, the state changes to INVALID.

Since the state always changes to INVALID in a CPU-Read-Miss, the probability of I/O-Read-Miss and I/O-Write-Miss generation increases, but this will not be a big disadvantage. Because the occurrence of this state is limited to the cases when the processor 1 makes a CPU-Read-Miss while the I/O device 6 carries out two or more accesses to the same cache line. Since the frequency of the cache consistency operations can be greatly reduced for memory accesses by I/O devices, according to the invention as explained above, the memory system performance can be greatly increased.

What is claimed is:

1. A computer system comprising:

a main memory having a multiplicity of addressable storage locations;

a cache memory having a plurality of addressable storage locations arranged in a plurality of cache lines, each cache line including "X" addressable storage locations;

a computer subsystem for accessing said main memory and for snooping said cache memory, said subsystem for accessing "Y" addressable storage locations per access cycle, wherein "Y" is less than "X";

wherein, when said subsystem accesses a first group of "X" addressable storage locations in said main memory during "Z" consecutive access cycles, and when said first group of "X" addressable storage locations are duplicated in a first cache line of said cache memory, said subsystem snoops said cache memory only during the first access cycle of said "Z" consecutive access cycles, such that no cache memory snooping occurs during the remaining "Z-1" access cycles.

2. The computer system of claim 1, wherein:

each addressable storage location stores one byte of data;

X=32, such that each cache line holds 32 bytes of data;

Y=4; such that 4 bytes of data are transferred between said subsystem and said main memory or said cache memory during each access cycle; and Z=8, such that 8 access cycles are required to transfer an entire cache line of data.

* * * * *